United States Patent
Bertrand et al.

(10) Patent No.: US 12,454,989 B2
(45) Date of Patent: Oct. 28, 2025

(54) HELICAL CONNECTION MECHANISM FOR ELECTROMECHANICAL BRAKE CALIPER PISTON WITH SIMPLIFIED MOUNTING

(71) Applicant: HITACHI ASTEMO FRANCE, Drancy (FR)

(72) Inventors: Jérôme Bertrand, Romainville (FR); Fabrice Umbdenstock, Paris (FR)

(73) Assignee: ASTEMO FRANCE, Drancy (FR)

( * ) Notice: Subject to any disclaimer, the term of this patent is extended or adjusted under 35 U.S.C. 154(b) by 475 days.

(21) Appl. No.: 17/907,582

(22) PCT Filed: Mar. 25, 2021

(86) PCT No.: PCT/FR2021/050519
§ 371 (c)(1),
(2) Date: Sep. 28, 2022

(87) PCT Pub. No.: WO2021/198595
PCT Pub. Date: Oct. 7, 2021

(65) Prior Publication Data
US 2023/0128238 A1   Apr. 27, 2023

(30) Foreign Application Priority Data
Apr. 2, 2020 (FR) ........................... 2003307

(51) Int. Cl.
*F16D 65/18* (2006.01)
*F16D 121/24* (2012.01)
*F16D 125/40* (2012.01)

(52) U.S. Cl.
CPC .......... *F16D 65/18* (2013.01); *F16D 2121/24* (2013.01); *F16D 2125/40* (2013.01)

(58) Field of Classification Search
CPC ........ F16D 55/226; F16D 65/14; F16D 65/18; F16D 65/183; F16D 2121/04;
(Continued)

(56) References Cited

U.S. PATENT DOCUMENTS

2013/0206519 A1   8/2013   Vinck et al.
2017/0082161 A1*  3/2017   Son .................. F16D 65/183
(Continued)

FOREIGN PATENT DOCUMENTS

DE    102018213850 A1    2/2020
EP       0062567 A1   10/1982
(Continued)

OTHER PUBLICATIONS

Search Report for French application No. FR2003307 dated Oct. 15, 2020.
(Continued)

*Primary Examiner* — Robert A. Siconolfi
*Assistant Examiner* — San M Aung
(74) *Attorney, Agent, or Firm* — McDonald Hopkins LLC

(57) ABSTRACT

A helical connection mechanism for an electromechanical brake piston is configured to be mounted in the piston, including a sleeve and a drive member cooperating by a helical connection of longitudinal axis (AX), and a locking structure for rotationally locking the sleeve relative to the piston about the longitudinal axis (AX) and for axially holding the mechanism. The locking structure includes a plate attached to the sleeve and extending orthogonally to the longitudinal axis (AX), at least three axial extensions cooperating with an axial wall of the piston and at least one radial shape cooperating with the axial wall of the piston.

13 Claims, 3 Drawing Sheets

(58) Field of Classification Search
CPC ............. F16D 2121/14; F16D 2121/24; F16D 2125/40; F16D 65/38; F16D 2125/06; F16D 2125/36; F16D 2065/386; F16H 25/20; F16H 25/24; F16H 25/2204
USPC .......................................................... 188/71.1
See application file for complete search history.

(56) References Cited

U.S. PATENT DOCUMENTS

| | | | |
|---|---|---|---|
| 2017/0261053 A1* | 9/2017 | Schaefer | F16D 55/226 |
| 2017/0356514 A1* | 12/2017 | Kim | F16H 25/2018 |
| 2018/0080515 A1* | 3/2018 | Leidecker | F16J 1/005 |
| 2018/0094683 A1* | 4/2018 | Kim | F16D 65/18 |
| 2019/0145505 A1* | 5/2019 | Bourlon | F16D 55/226 |
| | | | 188/72.8 |
| 2019/0277355 A1* | 9/2019 | Kim | F16D 65/18 |

FOREIGN PATENT DOCUMENTS

| | | | |
|---|---|---|---|
| FR | 3050493 A1 * | 10/2017 | ............ B60T 13/741 |
| FR | 3057638 A1 | 4/2018 | |
| FR | 3069297 A1 | 1/2019 | |
| KR | 20130058263 A | 6/2013 | |
| WO | 2018104649 A1 | 6/2018 | |

OTHER PUBLICATIONS

International Search Report for PCT/FR2021/050519 dated Aug. 16, 2021.
Written Opinion for PCT/FR2021/050519 dated Aug. 16, 2021.
Office Action for Chinese Patent Application No. 202180026940.6, dated Mar. 26, 2025.

* cited by examiner

HELICAL CONNECTION MECHANISM FOR ELECTROMECHANICAL BRAKE CALIPER PISTON WITH SIMPLIFIED MOUNTING

CROSS-REFERENCE TO RELATED APPLICATIONS

This is a National Stage of PCT international application PCT/FR2021/050519, filed on Mar. 25, 2021, which claims the priority of French Patent Application No. FR2003307, filed Apr. 2, 2020, both of which are incorporated herein by reference in their entirety.

TECHNICAL FIELD

The invention relates to a helical connection mechanism for the piston of a disc brake caliper with an electromechanical actuator.

BACKGROUND OF THE INVENTION

An electromechanical disc brake comprises a caliper straddling a braking disc, this caliper comprising a caliper body which carries two pads on either side of the disc and which is equipped with an electromechanical actuator for pressing these pads against the disc when activated, in order to generate a braking torque.

The caliper body has a cylindrical housing extending between the actuator and one of the pads, in which a movable piston having its head bearing on this pad, slides. The actuator has an output shaft coupled to a driver or drive member forming part of a helical type connection located in the cylindrical housing and partly in the piston, to be interposed between the actuator and the piston head.

When the actuator is activated, it exerts a torque via its output shaft, which is transformed into a pressing force by a helical connection mechanism, so that the piston presses the pad onto the disc. The caliper is usually mounted floating along the axial direction of the disc, so that the pressing force exerted by a single piston is sufficient to press the two opposing pads against the disc.

In such a system, the helical connection is irreversible: a force exerted on the piston does not result in a torque being exerted by the drive screw. This connection comprises a sleeve into which the drive member is screwed, housed in the piston and linked thereto by a prismatic type connection, that is, allowing the sleeve to slide longitudinally in the piston but preventing it from rotating in relation thereto. The piston slides in its housing while being rotationally locked relative to the caliper body.

The prismatic connection is made by means of a plate secured to the sleeve and extending transversely to the axis of the sleeve and having on its external periphery notches which cooperate with longitudinal ribs formed on the internal surface of the piston.

When the actuator is activated, which generally corresponds to a parking brake command, the sleeve bearing against an internal face of the piston head pushes the piston towards the disc. Independently, a pressurisation of the piston housing, generally corresponding to a service brake command, also allows this piston to be pressed towards the disc.

However, during the assembly of the brake, in particular during the mounting of the helical connection mechanism, the latter can be askew relative to the longitudinal axis, which complicates further assembly, especially the connection between the drive member and the electric motor.

DISCLOSURE OF THE INVENTION

It is therefore one purpose of the present invention to provide a helical connection mechanism for an electromechanical disc brake caliper piston facilitating the assembly of the brake.

The above stated purpose is achieved by a helical connection mechanism for an electromechanical disc brake caliper piston comprising a sleeve and a drive member cooperating with each other by a helical connection, and means for rotationally stopping the sleeve in the piston, said stopping means also ensuring holding of the sleeve and the drive member in a position coaxial to the piston.

In one exemplary embodiment, the rotational stopping and axial holding means comprise a plate attached to the sleeve and axial extensions shaped to cooperate with the internal surface of the piston and to ensure both the rotational locking of the sleeve relative to the piston and its alignment with the axis of the piston.

In another exemplary embodiment, the rotational stopping and axial holding means comprise a plate attached to the sleeve and axial extensions shaped to cooperate with the internal surface of the piston and ensure its alignment with the axis of the piston and at least one shape cooperating with the internal surface of the piston and ensuring the rotational locking of the sleeve relative to the piston and Very advantageously, the means are made by cutting, bending and stamping from a metal sheet. The manufacture is very simple. Furthermore, the mass of the plate and extensions assembly is low.

In other words, the anti-rotation function is supplemented by the anti-tilt function. The cost associated with this additional function is very low, or even zero.

The object of the present invention is then a helical connection mechanism for an electromechanical brake piston configured to be mounted in said piston, comprising a sleeve and a drive member cooperating by a helical connection of longitudinal axis, and means for rotationally locking said sleeve relative to the piston about the longitudinal axis and for axially holding the mechanism, said means comprising a plate attached to the sleeve and extending orthogonally to the longitudinal axis. The rotation locking and axial holding means comprising at least three axial extensions cooperating with an axial wall of the piston and at least one radial shape cooperating with the axial wall of the piston.

In one exemplary embodiment the at least one radial shape is carried by an axial extension.

The at least one radial shape may be a groove or rib axially extending along an axial extension.

In another exemplary embodiment, the at least one radial shape is a projection or recess in the external edge of the plate.

In one advantageous example, the means are made by cutting and bending a metal sheet.

One object of the present invention is also an electromechanical brake caliper comprising a caliper body comprising a housing enclosing a piston and a helical connection mechanism, said piston comprising an internal housing delimited by a bottom and a side wall, and a mechanism according to the invention, said side wall comprising in its internal surface at least one shape cooperating with the radial shape, said shape axially extending over the whole axial dimension of the internal surface of the side wall.

One object of the present invention is also a disc brake comprising a caliper according to the invention and an electric motor connected to the drive member.

One object of the present invention is also a method for manufacturing a helical connection mechanism according to the invention, comprising:

a) providing a sleeve and a drive member and assembling the sleeve and the drive member,
b) cutting from a metal sheet a shape comprising the plate and elongated parts,
c) deforming said elongated parts so as to form the axial extensions and optionally the at least one radial shape,
d) attaching said shape to said sleeve.

In one example, said shape comprises at least one radial shape and elongated parts tangential to the plate. Step c) may comprise, for example, bending to fold down the elongated parts about axes extending radially relative to the longitudinal axis.

In another example, said shape comprises elongated parts extending radially. Step c) comprises, for example, bending to fold down the elongated parts about axes tangential to a circle circumscribed by the plate and stamping at least one elongated part to form the at least one radial shape.

BRIEF DESCRIPTION OF THE DRAWINGS

The invention will be better understood using the following description and the appended drawings, in which.

DETAILED DISCLOSURE OF PARTICULAR EMBODIMENTS

Figure 1:
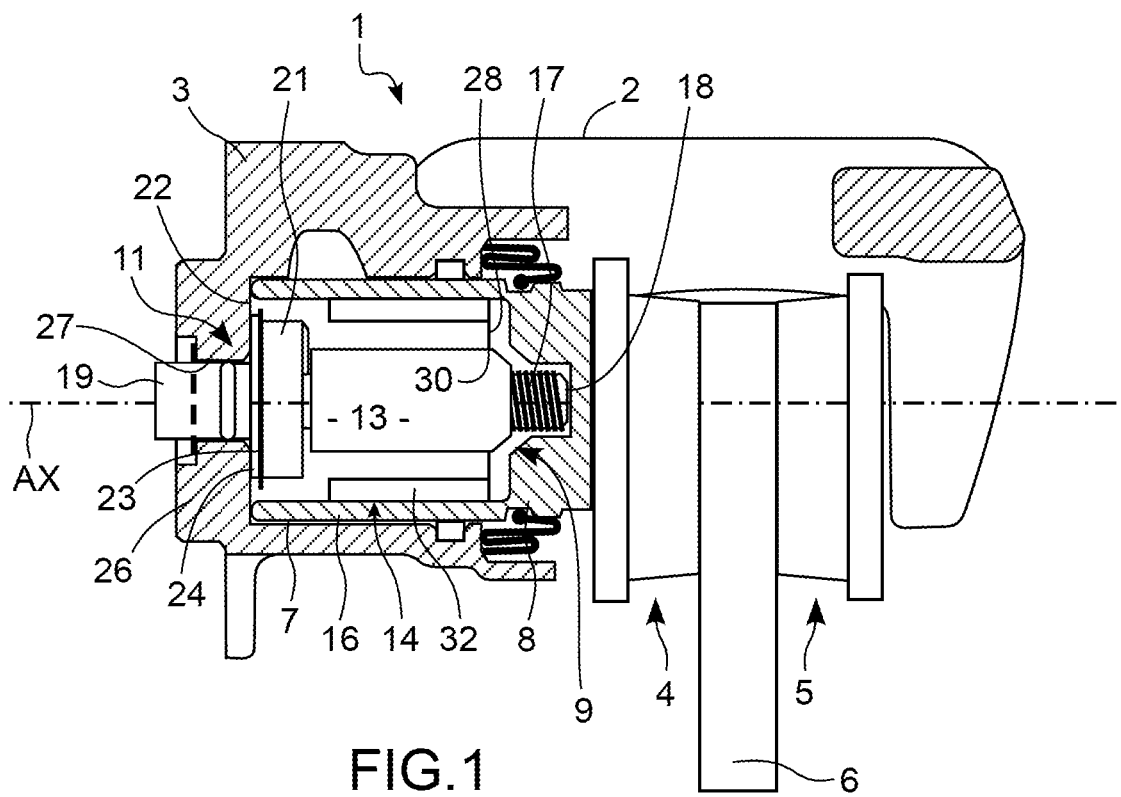
FIG. 1 is a schematic cross section view of an electromechanical disc brake.

In FIG. 1, an electromechanical disc brake denoted as 1 can be seen, comprising a caliper 2 comprising a caliper body 3 carrying two pads 4 and 5 sandwiching a disc 6, said caliper body 3 being equipped with an electromechanical actuator not represented.

The caliper body comprises a cylindrical housing 7 extending between the actuator and one of the pads, in which is housed a movable piston 8 having its head bearing on the pad 4, this piston 8 being translationally movable along an axial direction AX and rotationally locked about the axis AX relative to the caliper body 3.

This piston 8 is moved or pressed against the pad 4 by means of a helical connection mechanism 9 which is coupled to the actuator not represented, the helical connection mechanism 9 being housed mainly in the piston 8.

This helical connection mechanism 9 comprises a driver or drive member 11 screwed into a sleeve 13 which carries means 14 for rotationally locking the sleeve 13 relative to the piston 8 and for holding the mechanism aligned with the axis AX of the piston. As visible in FIG. 1, the sleeve 13 and the means 14 are located in the internal space delimited by the cylindrical skirt 16 of the piston 8.

More particularly, the drive member 11 comprises a threaded body 17 having a free end 18 and a coupling end 19 for coupling to the actuator not represented, as well as a head 21 located in the vicinity of the coupling end 19.

The head 21 is generally shaped as a circular plate of significant thickness having an external diameter less than the internal diameter of the skirt 16. This head 21 has a bearing face 23 oriented towards the coupling end 19, and by which it bears against a planar bottom 22 of the cylindrical housing 7, by means of a bearing washer 24.

As visible in FIG. 1, the coupling end 19 sealingly passes through a wall 26 of the caliper body 3 delimiting the bottom 22, via a hole 27 formed in this wall 26, to allow the coupling of the output shaft of the actuator not represented to this end 19, which thus protrudes from the caliper body 3. For example, the end 19 has a hexagon-type hollow cavity into which an end of the output shaft of the actuator which is fitted against the caliper body 3 on the external face of the wall 26, engages. This type of connection is not restrictive.

Rotation in the tightening direction of the drive member 11, responsively to a parking brake command, allows the sleeve 13 to be moved away from the head 21 so that it presses the piston 8 against the pad 4 in order to generate a braking torque. Conversely, rotation in the release direction, responsively to a park brake release command, moves the sleeve 13 towards the head 21 to reduce and cancel the braking torque.

Besides the housing 7 and the mechanism 9 are immersed in liquid. An increase in the pressure of this liquid, responsively to a command to activate the service brake, thus presses the piston against the pad 4 to generate a braking torque. Conversely, a decrease in pressure, responsively to a service brake release command, reduces the pressure exerted by the piston on the pad 4 to reduce or even cancel the braking torque.

Figure 2:
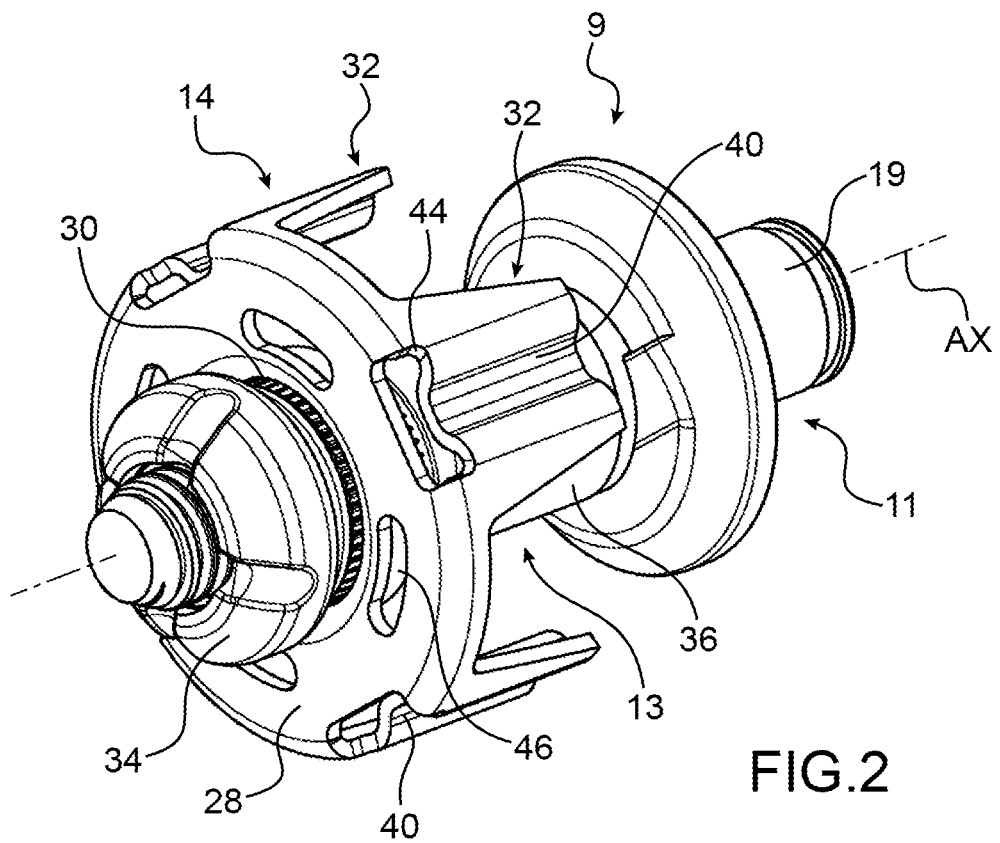
FIG. 2 is a perspective view of a helical connection mechanism according to an exemplary embodiment.

In FIG. 2, an exemplary embodiment of the means 14 can be seen.

The means 14 comprise a plate 28 comprising a central aperture 30 mounted around the sleeve 13 and axial extensions 32 extending from the radially external periphery of the plate towards the head 21. The plate is rotationally immovable relative to the sleeve, for example by crimping. Advantageously, the sleeve has axial grooves to improve the rotational clamping.

In the example represented, the sleeve 13 comprises a head 34 and a body 36 carrying the internal thread and which the threaded drive member enters.

The axial extensions comprise axial grooves 40 intended to cooperate with axial ribs 42 (FIG. 3) carried by the internal wall of the piston skirt 8 and improving by cooperation the clamping of the plate and thus of the sleeve relative to the piston. Alternatively, the axial extensions 40 have ribs and the skirt has grooves. The external diameter of the circle circumscribed by the axial extensions is substantially equal to or less than the internal diameter of the piston to ensure insertion of the mechanism into the piston while ensuring alignment between the mechanism and the axis of the piston. It will be understood that the alignment of the mechanism with the axis of the piston may not be very accurate, a tolerance is allowed for manufacturing clearances.

Alternatively, only part of the axial extensions has a rib or groove cooperating with the piston, for example a single rib or groove which is sufficient to rotationally lock the sleeve relative to the piston.

In the example represented, the means 14 comprise four axial extensions 32. Alternatively, the means 14 comprise three or more axial extensions. Preferably, the axial extensions are evenly angularly distributed around the plate.

Very advantageously, the plate 28 and the axial extensions 32 are made in one piece by cutting a sheet, bending and/or stamping a steel sheet.

The means 14 are therefore relatively simple and inexpensive to produce.

After cutting, the extensions extend radially from the plate, generally having a four-pointed star shape.

In this example, cut-outs 44 are made at the attachment of the axial extensions 32 to the plate 28, reducing the force required for bending and limiting the occurrence of "material bulges" during bending.

Figure 3:
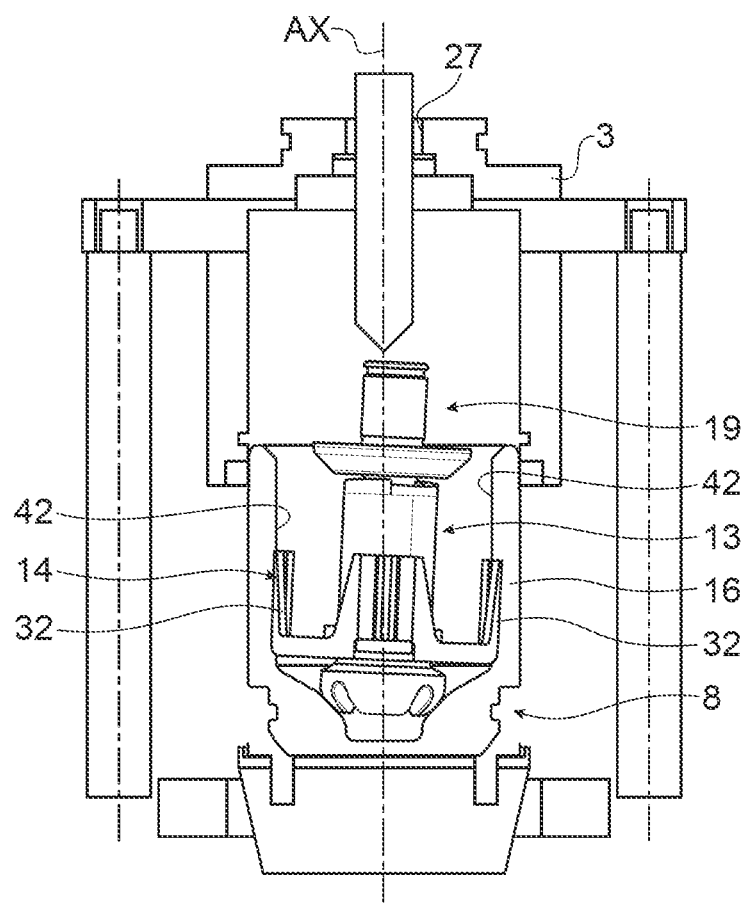
FIG. 3 is a partial longitudinal cross section view of the mechanism of FIG. 2 mounted in a disc brake piston.

In FIG. 3, the mechanism of FIG. 2 can be seen mounted in a piston, with the axial extensions 32 forming legs to ensure alignment of the sleeve and drive member with the axis of the piston.

This facilitates further assembly of the brake. Indeed, as schematised in FIG. 3, when the piston is mounted in the caliper housing 7, the end 19 of the drive member slides along the longitudinal axis AX of the housing 7 and is automatically aligned with the hole 27 of the caliper body which is aligned with the axis AX.

Alternatively, rotational clamping is achieved by radial projections of the plate extending in the plane of the plate and cooperating with axial grooves in the piston, and holding the alignment is achieved by axial extensions, having in cross-section the shape of an arc of radius corresponding to the internal radius of the piston mantle.

Figure 4:
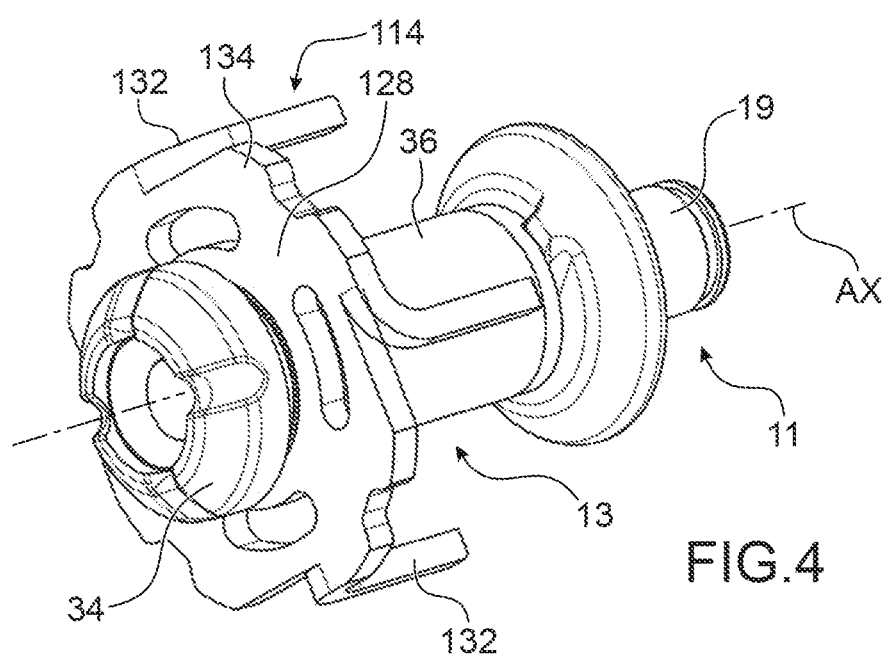
FIG. 4 is a perspective view of a helical connection mechanism according to another exemplary embodiment.

In FIG. 4, another exemplary embodiment of the means 114 can be seen, in which, after cutting, the extensions 132 extend substantially tangentially to a circle centred on the longitudinal axis.

During bending, each axial extension 132 is bent closer to the longitudinal axis, about a substantially radial axis, unlike the extensions of FIG. 2 which are each bent about an axis tangent to a circle circumscribed by the plate.

Furthermore, in this example, rotational locking of the sleeve relative to the piston is achieved by means of radial projections 134 carried by the plate cooperating with axial grooves carried by the internal surface of the piston skirt. Alternatively, the extensions 132 could be such that they also ensure rotational locking.

In this example, the faces of the axial extensions cooperating with the internal surface of the piston skirt are planar.

Figure 5:
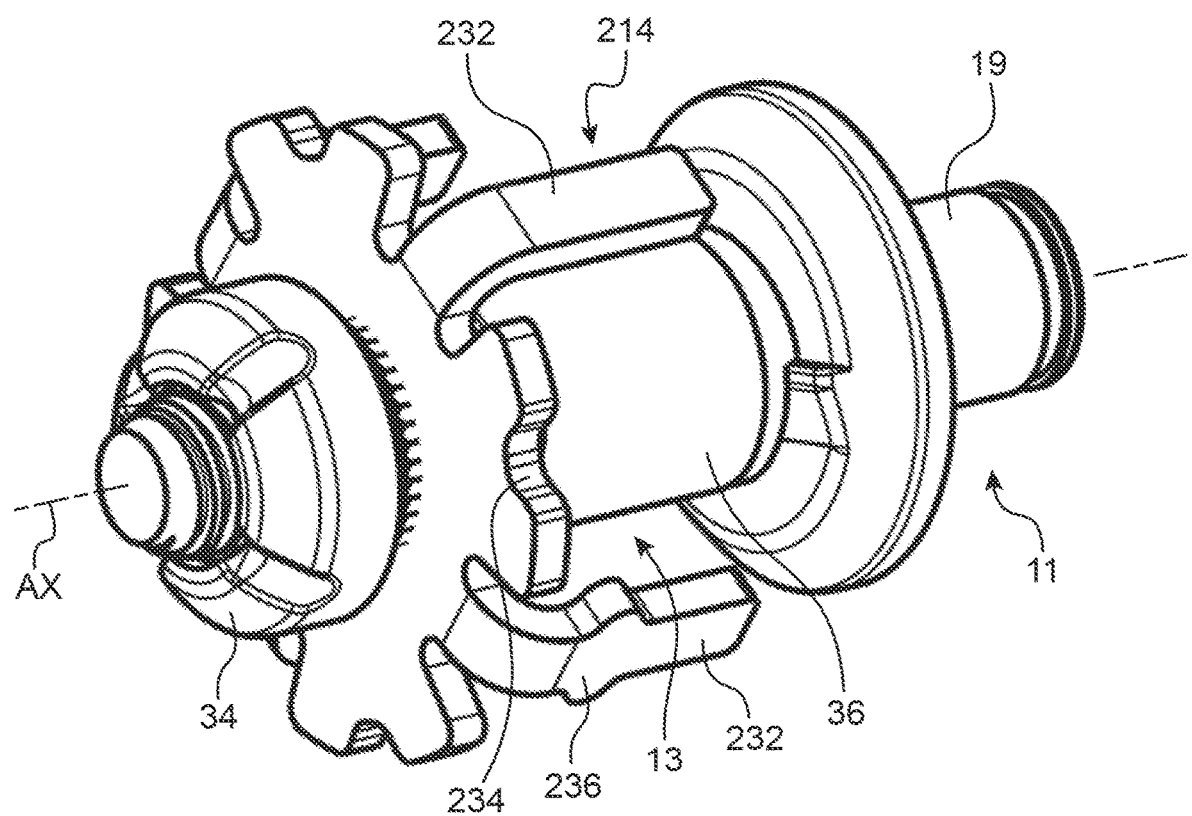
FIG. 5 is a perspective view of a helical connection mechanism according to another exemplary embodiment.

In FIG. 5, a further exemplary embodiment of means 214 can be seen in which, after cutting, the extensions 232 extend substantially radially.

During bending, each axial extension 232 is bent closer to the longitudinal axis about an axis tangent to a circle centred on the longitudinal axis.

Rotational locking of the sleeve relative to the piston is improved by means of radial recesses or radial indentations 234 carried by the plate cooperating with axial ribs carried by the internal surface of the piston skirt. The radial recesses are achieved by cutting. Alternatively, the extensions 232 could be such that they also ensure rotational locking.

In this example, the faces of the axial extensions cooperating with the internal surface of the piston skirt are planar.

In the example of FIG. 5, four longitudinal extensions 232 are provided. In addition, two of the four extensions have, substantially at mid-length, an enlarged zone 236, that is, which has a transverse dimension greater than the transverse dimension of the rest of the extension. The enlargement is arranged in the plane of the longitudinal extension.

The advantage of this example implementation is that it has a reduced mass, reducing the unsprung weight and promoting the stability of the vehicle.

Very advantageously, the means 14, 114, 214 are made by cutting and bending and/or stamping a steel sheet.

The ratio of the length of the axial extensions to the length of the piston and/or helical connection mechanism is advantageously of between ¼ and ¾, preferably in the order of ½.

In the example represented, all axial extensions have the same length. Alternatively, they have different lengths.

An example of the assembling method will now be described.

Consider the mechanism shown in FIG. 2:

The drive member is screwed into the sleeve 13, thus forming the helical connection mechanism.

The helical connection mechanism is then inserted into the piston by aligning the axial extensions with the ribs of the piston skirt. The mechanism is then slid into the piston. The cooperation of the axial extensions with the piston skirt ensures rotational clamping of the sleeve and holding of the alignment between the drive member and the axis of the piston.

In a next step, the piston equipped with the helical connection mechanism is inserted into the caliper bore. The caliper is slid into the bore. Due to the alignment of the drive member with the axis of the piston and thus the axis of the bore, the end 19 of the drive member 11 is aligned with the hole 27 in the caliper and enters it naturally. Then the electric motor is mounted on the outside of the caliper, and its shaft is connected to the end 19 of the drive member.

By virtue of the invention, the mounting is simplified, and can be automated.

NOMENCLATURE 1 brake
2 caliper
3 caliper body
4 pad
5 pad
6 disc
7 housing
8 piston
9 mechanism
11 driver
13 sleeve
14 rotational locking and axial holding means
16 skirt
17 threaded body
18 free end
19 coupling end
21 head
22 planar bottom
23 bearing face
24 bearing washer
26 wall
27 hole
28 plate
30 central aperture
32 axial extension
34 head
36 body
40 axial groove
42 axial rib
44 cut-out
46 plate hole
114, 214 rotational locking and axial holding means
128 plate
132, 232 axial extension
134 radial extension
234 radial recess
236 enlarged zone

What is claimed is:

1. A helical connection mechanism for an electromechanical brake piston configured to be mounted in the piston,
wherein the helical connection mechanism comprises a sleeve and a drive member cooperating by a helical connection of longitudinal axis,
wherein the drive member comprises a head and rotational locking and axial holding means for rotationally locking the sleeve relative to the piston about the longitudinal axis and for axially holding the helical connection mechanism,
wherein the rotational locking and axial holding means comprise a plate attached to the sleeve and extending orthogonally to the longitudinal axis,
wherein the rotational locking and axial holding means comprise at least three axial extensions cooperating with an axial wall of the piston and at least one radial shape cooperating with the axial wall of the piston,
wherein the axial extensions extend from a radially external periphery of the plate towards the head, and
wherein the axial extensions form legs configured to ensure alignment of the sleeve and the drive member with an axis of the piston.

2. The helical connection mechanism according to claim 1, wherein the at least one radial shape is carried by an axial extension.

3. The helical connection mechanism according to claim 2, wherein the at least one radial shape is a groove or a rib axially extending along an axial extension.

4. The helical connection mechanism according to claim 1, wherein the at least one radial shape is a projection or recess in the external edge of the plate.

5. The helical connection mechanism according to claim 1, wherein the rotational locking and axial holding means are made by cutting and bending a metal sheet.

6. A caliper for an electromechanical brake comprising a caliper body comprising:
a housing enclosing a piston and a helical connection mechanism,
wherein the piston comprises an internal housing delimited by a bottom and a side wall, and the helical connection mechanism according to claim 1,
wherein the side wall has an internal surface having at least one axial shape cooperating with the radial shape, wherein the axial shape axially extends over the whole axial dimension of the internal surface of the side wall.

7. A disc brake comprising the caliper according to claim 6, and an electric motor connected to the drive member.

8. A method for manufacturing a helical connection mechanism for an electromechanical brake piston configured to be mounted in the piston,
wherein the helical connection mechanism comprises a sleeve and a drive member cooperating by a helical connection of longitudinal axis,
wherein the drive member comprises a head and rotational locking and axial holding means for rotationally locking the sleeve relative to the piston about the longitudinal axis and for axially holding the helical connection mechanism,
wherein the rotational locking and axial holding means comprise a plate attached to the sleeve and extending orthogonally to the longitudinal axis,
wherein the rotational locking and axial holding means comprise at least three axial extensions cooperating with an axial wall of the piston and at least one radial shape cooperating with the axial wall of the piston, and
wherein the axial extensions extend from a radially external periphery of the plate towards the head, the method comprising:

a) providing a sleeve and a drive member and assembling the sleeve and the drive member,
b) cutting from a metal sheet the plate and elongated parts,
c) deforming the elongated parts so as to form the axial extensions,
d) attaching the plate and elongated parts to the sleeve.

9. The method according to the claim 8, wherein the plate and elongated parts comprise the at least one radial shape and elongated parts tangential to the plate.

10. The method according to claim 9, wherein step c) includes bending to fold down the elongated parts about axes extending radially relative to the longitudinal axis.

11. The method according to claim 8, wherein the elongated parts extend radially.

12. The method according to claim 11, wherein step c) comprises bending to fold down the elongated parts about axes tangential to a circle circumscribed by the plate and stamping at least one elongated part to form the at least one radial shape.

13. The manufacturing method according to claim 8, wherein step c) includes deforming the elongated parts so as to form the at least one radial shape.

* * * * *